(12) United States Patent
Janoff et al.

(10) Patent No.: US 6,564,011 B1
(45) Date of Patent: May 13, 2003

(54) SELF-REGULATING HEAT SOURCE FOR SUBSEA EQUIPMENT

(75) Inventors: Dwight D. Janoff, Missouri City, TX (US); John C. Vicic, Spring, TX (US)

(73) Assignee: FMC Technologies, Inc., Chicago, IL (US)

( * ) Notice: Subject to any disclaimer, the term of this patent is extended or adjusted under 35 U.S.C. 154(b) by 7 days.

(21) Appl. No.: 09/644,615

(22) Filed: Aug. 23, 2000

(51) Int. Cl.$^7$ ................................................. F24H 1/10
(52) U.S. Cl. ........................................ 392/480; 392/479
(58) Field of Search ................................. 392/480, 535, 392/465, 468, 469, 479

(56) References Cited

U.S. PATENT DOCUMENTS

| | | | |
|---|---|---|---|
| 3,522,413 A | | 8/1970 | Chrow |
| 3,643,736 A | | 2/1972 | Talley, Jr. |
| 3,727,029 A | | 4/1973 | Chrow |
| 3,731,534 A | * | 5/1973 | Painley et al. ............... 73/273 |
| 3,861,029 A | * | 1/1975 | Smith-Johannsen et al. .. 29/611 |
| 3,975,617 A | | 8/1976 | Othmer |
| 4,242,573 A | * | 12/1980 | Batliwalla .................... 219/504 |
| 4,303,826 A | | 12/1981 | Ando |
| 5,289,561 A | | 2/1994 | Costa Filho |
| 5,294,780 A | * | 3/1994 | Montierth et al. ........... 219/535 |
| 5,925,276 A | | 7/1999 | Batliwalla et al. |
| 5,933,574 A | * | 8/1999 | Avansino .................... 392/468 |
| 5,979,506 A | | 11/1999 | Aarseth |
| 6,014,498 A | * | 1/2000 | Ikeda et al. ................. 392/479 |
| 6,035,933 A | * | 3/2000 | Khalil et al. ................. 166/263 |

FOREIGN PATENT DOCUMENTS

| | | |
|---|---|---|
| GB | 2 304 392 A | 3/1997 |
| NO | 302450 B1 | 11/1992 |
| WO | WO 98/01010 A1 | 1/1998 |

OTHER PUBLICATIONS

Raychem on–line brochure, "Industrial Pipe Freeze Protection", 1998.
Raychem brochure, "BTV Self–Regulating Heating Cables", 1998.
Raychem brochure, "Auto–Trace Heat–Tracing Systems for Ordinary and Division 2 Areas", 1998.

* cited by examiner

Primary Examiner—Teresa Walberg
Assistant Examiner—Thor Campbell
(74) Attorney, Agent, or Firm—Henry C. Query, Jr.

(57) ABSTRACT

A heating device for a subsea oil and gas production equipment component comprises at least one heating cable which includes first and second generally parallel electrical conductors that are positioned in heat exchange relation with respect to a flow path through the component, a source of electrical power which is connected to the first and second electrical conductors and which when activated conducts a current between the conductors to generate heat, and an insulation layer which is disposed over the heating cable and the component. When the temperature of a well fluid in the component drops to a point below its flow temperature, the heating cable will generate heat that is transferred to the well fluid to maintain the temperature of the well fluid above its hydrate formation temperature.

14 Claims, 2 Drawing Sheets

SELF-REGULATING HEAT SOURCE FOR SUBSEA EQUIPMENT

BACKGROUND OF THE INVENTION

The present invention relates to an apparatus for preventing the formation of alkane hydrates in subsea oil and gas production equipment. More particularly, the invention relates to such an apparatus which comprises one or more heating cables to maintain the produced well fluid in the production equipment above a predetermined temperature below which alkane hydrates will form.

Subsea oil and gas wells which are located at depths greater that 5,000 feet or at extreme latitudes are exposed to water which is typically just a few degrees above freezing. Although the well fluid is relatively hot as it flows through the subsea production equipment, the surrounding water will cool the fluid rapidly when the flow is interrupted for any length of time, such as by a temporary well shut down. If the well fluid is allowed to cool to below the hydrate formation temperature of the fluid, which averages about 70° F. for typical hydrocarbons, alkane hydrates may form in the fluid which may block the flow paths through the production equipment.

In the prior art, thermal insulation materials have been used on the subsea equipment to retard the cooling of the well fluid until flow can be restored or a hydrate inhibitor can be injected into the fluid. However, several inches of insulation are usually required to provide the necessary thermal barrier, and this affects the design and manufacture of the subsea equipment and adds significantly to the cost of the equipment. In addition, the hydrate inhibitor and the equipment required to inject it into the fluid are relatively expensive.

SUMMARY OF THE INVENTION

The present invention addresses these and other disadvantages in the prior art by providing a heating device for preventing the formation of alkane hydrates in a subsea oil and gas production equipment component having at least one flow path through which a well fluid is permitted to flow. The heating device comprises at least one heating cable which is positioned in heat exchange relation with respect to the flow path, a source of electrical power connected to the heating cable and an insulation layer disposed over the heating cable and the component. When the temperature of the well fluid in the component drops to a point below its flow temperature, the heating cable will generate heat and this heat will be transferred to the well fluid to maintain the temperature of the well fluid above its hydrate formation temperature. The insulation layer helps to direct the heat from the heating cable into the component and also serves to seal and protect the heating cable from the ambient water. The heating cable is preferably self-regulating, that is, it increases its heat output as the temperature of the heating cable drops and decreases its heat output as the temperature rises. Alternatively, the heating device could also comprise a thermostat to energize the heating cable when the temperature of the well fluid drops below a first predetermined temperature and deactivate the heating cable when the temperature rises above a second predetermined temperature. Thus, the heating device effectively maintains the temperature of the well fluid above its hydrate formation temperature without the need for bulky insulation or costly hydration inhibitors.

These and other objects and advantages of the present invention will be made more apparent from the following detailed description, with reference to the accompanying drawings. In the drawings, the same reference numbers are used to denote similar components in the various embodiments.

DETAILED DESCRIPTION OF THE PREFERRED EMBODIMENTS

In accordance with the present invention, a preferably self-regulating heating device is used in conjunction with a subsea oil and gas production equipment component to prevent the temperature of a well fluid flowing through the component from dropping below its hydrate formation temperature, that is, the temperature below which alkane hydrates will begin to form in the fluid. The average hydrate formation temperature for the common hydrocarbons that are produced through typical subsea wells is approximately 70° F. This temperature is several tens of degrees below the normal flow temperature of the well fluid, that is, the temperature of the well fluid as it flows through the production equipment. As used in this application, the term subsea oil and gas production equipment component is meant to include all the typical equipment which is used to produce oil or gas and through which such well fluids are permitted to flow during any phase of operation of the equipment. By way of example, such production equipment components can include wellheads, christmas trees, valves, flow control components, flow loops, flow lines, pipes, jumpers, manifolds, pipelines and risers. Also, in the context of the present invention, the phrase "preventing the formation of alkane hydrates" and similar phrases used herein should be interpreted to mean impeding the formation of alkane hydrates for a length of time which is greater than the time which would normally transpire before alkane hydrates would begin to form in the absence of the present invention.

Figure 1:
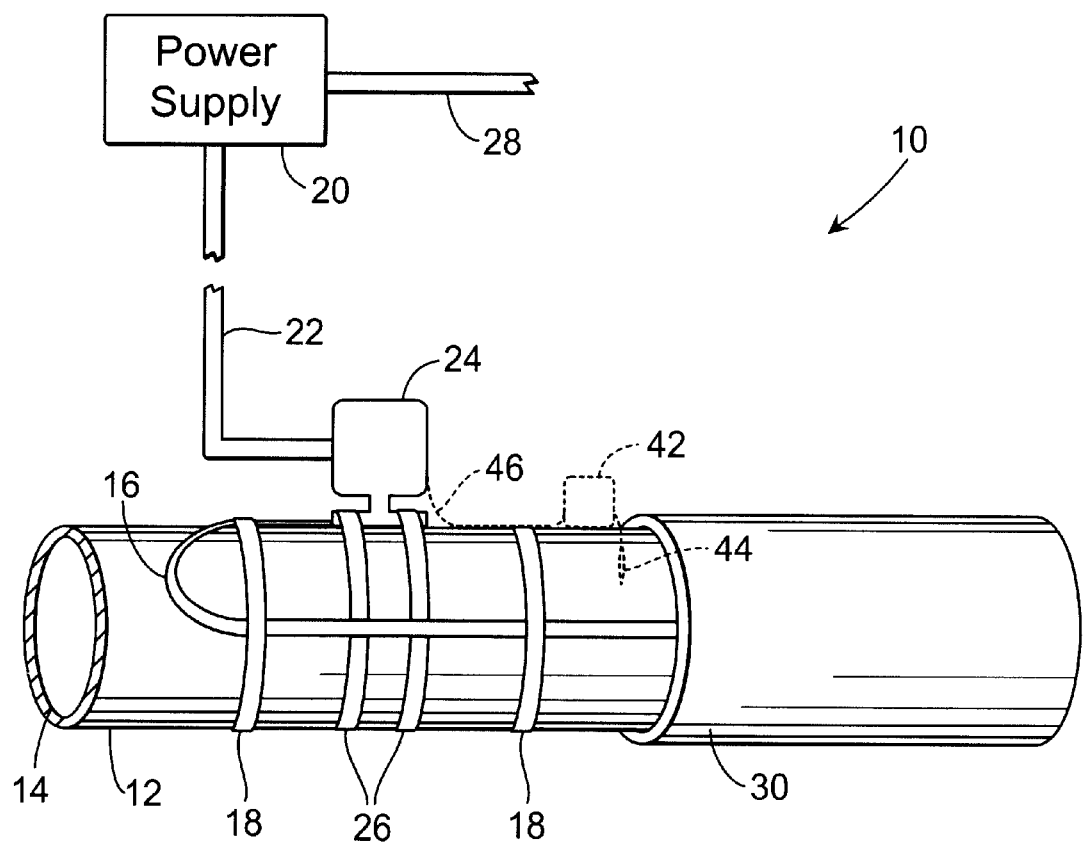
FIG. 1 is a partial perspective, partial schematic view of one embodiment of the heating device of the present invention shown installed on a subsea oil and gas production equipment component, with elements of a second embodiment of the heating device shown in phantom.

Referring to FIG. 1, the heating device of the present invention, which is indicated generally by reference number 10, is shown installed on a generally tubular subsea oil and gas production equipment component 12 having a flow path 14 through which a well fluid (not shown) is permitted to flow. Consistent with the above definition, the component 12 shown in FIG. 1 could be, for example, a flow loop, a flow line, a pipe, a jumper, a riser or a pipeline. The heating device 10 comprises a heating cable 16 which is secured to the component 12 by suitable means, such as strips of glass tape 18. While the heating cable 16 is shown positioned longitudinally along the component 12, the cable could be spiral wound around the component if the heating demands of a particular application so require.

The heating device 10 also comprises a suitable source of electrical power for the heating cable 16, such as a power supply 20 which is appropriately designed for the type and length of heating cable employed. The power supply 20 is connected to the heating cable 16 via a power cable 22 and, ideally, a junction box 24, which is mounted to the component 12 with straps 26 or any other appropriate means. The power supply 20 is mounted to the production equipment and connected via an umbilical 28 to a standard line voltage source (not shown) located on a surface vessel or a nearby controls pod. Alternatively, the power supply 20 could be located on the surface vessel or the controls pod and connected to the junction box 24 via the umbilical 28. An appropriate ground fault circuit breaker (not shown) is optimally connected between the power supply 20 and the heating cable 16 to prevent damage to the production equipment or the heating device 10 in the event the heating cable is damaged and exposed to the surrounding water.

In accordance with a preferred embodiment of the invention, the heating device 10 also comprises a layer of non absorbent insulation 30 covering the heating cable 16 and the component 12. The insulation 30 serves to both insulate the component 12 and to seal the heating cable 16 from the surrounding water. In addition, the insulation 30 will direct the flow of heat from the heating cable 16 toward the component 12 rather than into the surrounding water. The insulation 30 is preferably constructed of a waterproof thermal insulation material which can be molded or trowelled onto the component 12. While the insulation 30 may consist of a foamed elastomer or a rigid cellular urethane material, it preferably is comprised of a polysulfide polymer resin such as the insulation material described in U.S. patent application No. 60/197,319, which is commonly owned herewith and which is hereby incorporated herein.

Figure 2:
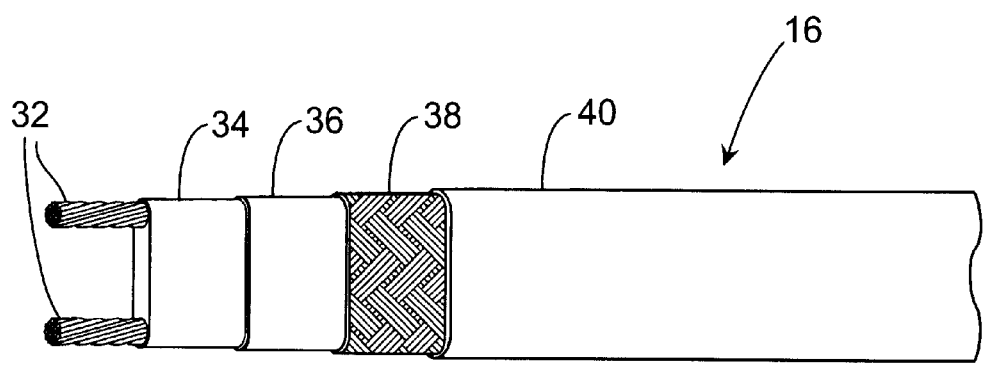
FIG. 2 is a partial perspective, peel away view of an exemplary heating cable component which may be used in the heating device of the present invention.

An exemplary heating cable 16 is illustrated in FIG. 2. The particular heating cable shown is a BTV-type heating cable which is available as part of a heat-tracing system sold by Raychem Corporation of Menlo Park, Calif. The particular type of heating cable 16 as well as any additional required components of the heat-tracing system may be determined based on the particular heating requirements of the production equipment with which the heating device 10 is intended to be used. As seen in FIG. 1, the heating cable comprises a pair of conductors 32 which are embedded in a core 34 that is made of a conductive polymer. The core 34 is wrapped in an inner insulating jacket 36 which is made of a modified polyolefin. The jacket 36 is surrounded by a protective braided copper sleeve 38 which in turn is wrapped by an outer insulating sleeve 40 that is made of a polyolefin or a fluoropolymer, depending on the environment in which the heating cable 16 will be used.

The heating cable 16 generates heat as electricity passes through the core 34 between the conductors 32. Due to the nature of the conductive polymer in the core 34, the heating cable 16 is self-regulating; that is, as the ambient temperature drops, the number of electrical paths through the core 34 increases and the heating cable therefore generates more heat. Conversely, as the ambient temperature rises, the number of electrical paths through the core 34 decreases and the heating cable therefore generates less heat. The core 34 is radiation cross-linked to ensure long-term thermal stability.

Of course, other types of heating cables 16 may be used in the present invention. For example, the heating cable 16 may comprise a series chain of standard resistive heating elements. Alternatively, the cable 16 may comprise a single elongated resistive heating element. Other heating devices may also be suitable for use as the heating cable 16 in the present invention.

In operation of the heating device 10, heat is conducted from the well fluid in the flow path 14, through the production equipment component 12 to the heating cable 16, and vice-versa. Thus, during normal flow conditions of the production equipment, the ambient temperature to which the heating cable is exposed will be near the flow temperature of the well fluid. At this temperature, the heating cable 16 will generate little or no heat. However, when the flow of well fluid through the component 12 is interrupted, for example by a temporary well shut down, the ambient water will cool the fluid and the temperature to which the heating cable 16 is exposed will begin to drop. When the temperature of the heating cable 16 drops below the maximum temperature which the cable is designed to maintain, for example 150° F., the heating cable 16 will begin to generate heat. As the temperature of the well fluid continues to drop, more electrical paths through the core 34 will be created and the heating cable 16 will generate more heat. Eventually, the heating cable will generate sufficient heat to maintain its temperature near the maximum temperature. This heat in turn will be transferred to the well fluid and will maintain the temperature of the well fluid above its hydrate formation temperature.

According to another aspect of the present invention, which is depicted in phantom in FIG. 1, the heating device 10 may comprise a thermostat 42 to energize the heating cable 16 when the temperature of the well fluid falls to a predetermined temperature above its hydrate formation temperature. In this embodiment, a temperature sensor 44 which is connected to the thermostat 42 is placed in contact with either the production equipment component 12 or directly with the well fluid in the flow path 14. The thermostat in turn is connected between the power supply 20 and the heating cable 16 via a cable 46. Thus, when the temperature of the component 12 or the well fluid drops to a first predetermined temperature above the hydrate formation temperature, for example 10° F. above the hydrate formation temperature, the thermostat will energize the heating cable 16. The heating cable 16 will preferably remain energized until the temperature of the component or the well fluid rises to a second predetermined temperature which is above the first predetermined temperature, for example 20° F. above the hydrate formation temperature. In this manner, the heating device 10 will be activated only within a narrow band of temperatures above the hydrate formation temperature, thereby helping to conserve energy.

Figure 3:
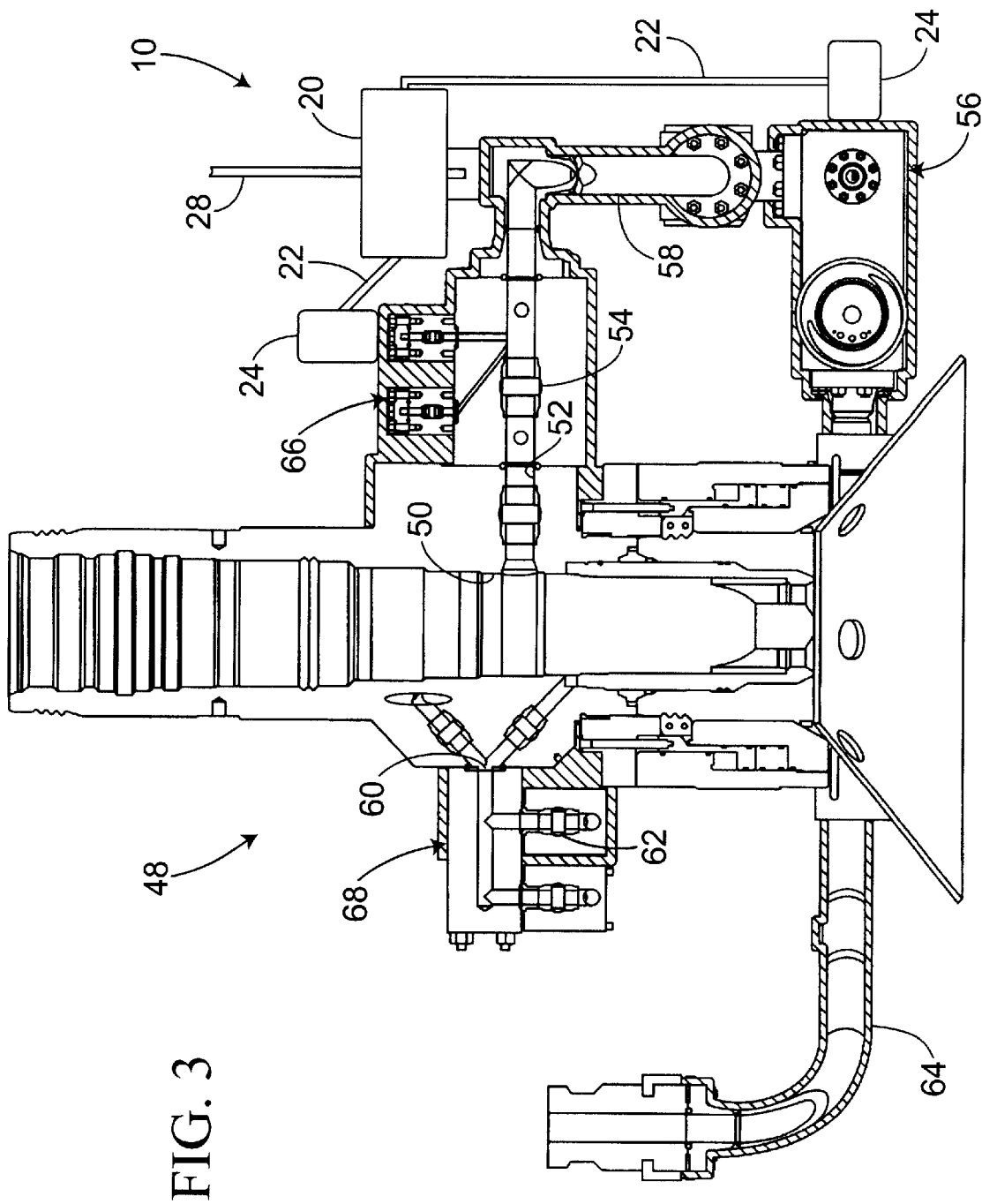
FIG. 3 is a cross sectional view of a subsea christmas tree having several components on which the heating device of the present invention is installed.

The heating device of the present invention can be used to prevent the formation of alkane hydrates in many different components of a subsea oil and gas production equipment assembly. Referring to FIG. 3 one or more heating devices 10 are shown installed on several components of a subsea christmas tree 48. The subsea Christmas tree typically includes an axial production bore 50 in communication with the well bore, a production outlet 52 connected to the production bore, one or more production valves 54 for controlling flow through the production outlet 52, a choke 56 connected to the production outlet 52 via a flow loop 58, an annulus outlet 60 connected to the tubing annulus surrounding the production tubing (not shown), one or more annulus valves 62 for controlling flow through the annulus outlet 60, and a production flow loop 64 for connecting the production outlet with a subsea flow line (not shown). Ideally, the heating device 10 is applied to those portions of the Christmas tree 48 which are most exposed to the surrounding seawater and through which the well fluid will flow. For example, in FIG. 3 the heating device 10 is shown applied to the production valve block 66 housing one or more of the production valves 54, the choke 56, the annulus valve block 68 housing one or more of the annulus valves 62, and the flow loops 58 and 64. In this Figure, the cross-hatched portions overlying the various components represents the heating cable 16 and the insulation 30 of a heating device 10. Of course, the heating device 10 may be applied to additional or fewer components of the subsea christmas tree 48 as desired or required under particular circumstances. In addition, it may be possible to use only one heating device 10 to heat more than one component. For example, FIG. 3 shows a heating device 10 which has a single power source 20 that is connected to one junction box 24 that is mounted on the valve block 66 and another junction box 24 that is mounted on the choke 56. Each of these junctions boxes is connected to a heating cable attached to the respective components.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

We claim:

1. In combination with a subsea oil and gas production equipment component having at least one flow path through which a well fluid is permitted to flow, the well fluid having a flow temperature and a lower hydrate formation temperature at which hydrates will form in the well fluid, a heating device comprising:
   at least one heating cable which is positioned in heat exchange relation with respect to the flow path and which comprises first and second generally parallel electrical conductors;
   a source of electrical power which is connected to the first and second electrical conductors and which when activated conducts a current between the conductors that generates heat in the heating cable; and
   an insulation layer disposed over the heating cable and the component;
   wherein when the temperature of the well fluid in the component drops to a point below its flow temperature, the heating cable will generate heat that is transferred to the well fluid to maintain the temperature of the well fluid above its hydrate formation temperature.

2. The device of claim 1, wherein the heating cable comprises a conductive polymer core disposed between the first and second electrical conductors.

3. The device of claim 2, wherein the amount of heat generated by the heating cable increases as the temperature of the heating cable decreases.

4. The device of claim 1, further comprising:
   a thermostat connected between the heating cable and the power source;
   the thermostat including means for sensing the temperature of the component;
   wherein when the temperature of the component drops below a first predetermined temperature which is above the hydrate formation temperature, the thermostat will energize the heating cable.

5. The device of claim 4, wherein when the temperature of the component rises above a second predetermined temperature which is above the first predetermined temperature, the thermostat will deactivate the heating cable.

6. The device of claim 1, further comprising:
   a thermostat connected between the heating cable and the power source;
   the thermostat including means for sensing the temperature of the well fluid;
   wherein when the temperature of the well fluid drops below a first predetermined temperature which is above the hydrate formation temperature, the thermostat will energize the heating cable.

7. The device of claim 6, wherein when the temperature of the well fluid rises above a second predetermined temperature which is above the first predetermined temperature, the thermostat will deactivate the heating cable.

8. A subsea christmas tree for producing a well fluid from a well bore, the well fluid having a flow temperature and a lower hydrate formation temperature at which hydrates will form in the well fluid, the christmas tree comprising:
   a production bore in communication with the well bore;
   a production outlet connected to the production bore;
   at least one production equipment component having at least one flow path in communication with the production outlet and through which the well fluid is permitted to flow; and
   means for preventing the formation of alkane hydrates in the flow path which comprises:
     at least one heating cable which is positioned in heat exchange relation with respect to the flow path and which comprises first and second generally parallel electrical conductors;
     a source of electrical power which is connected to the first and second electrical conductors and which when activated conducts a current between the conductors that generates heat in the heating cable; and
     an insulation layer disposed over the heating cable and the component;
     wherein when the temperature of the well fluid in the component drops to a point below its flow temperature, the heating cable will generate heat that is transferred to the well fluid to maintain the temperature of the well fluid above its hydrate formation temperature.

9. The christmas tree of claim 8, wherein the heating cable comprises a conductive polymer core disposed between the first and second electrical conductors.

10. The christmas tree of claim 9, wherein the amount of heat generated by the heating cable increases as the temperature of the heating cable decreases.

11. The Christmas tree of claim 8, further comprising:
    a thermostat connected between the heating cable and the power source;
    the thermostat including means for sensing the temperature of the component;
    wherein when the temperature of the component drops below a first predetermined temperature which is above the hydrate formation temperature, the thermostat will energize the heating cable.

12. The christmas tree of claim 11, wherein when the temperature of the component rises above a second predetermined temperature which is above the first predetermined temperature, the thermostat will deactivate the heating cable.

13. The christmas tree of claim 8, further comprising:
    a thermostat connected between the heating cable and the power source;
    the thermostat including means for sensing the temperature of the well fluid;
    wherein when the temperature of the well fluid drops below a first predetermined temperature which is above the hydrate formation temperature, the thermostat will energize the heating cable.

14. The christmas tree of claim 13, wherein when the temperature of the well fluid rises above a second predetermined temperature which is above the first predetermined temperature, the thermostat will deactivate the heating cable.

* * * * *